United States Patent

[11] 3,592,971

[72] Inventor Michael C. J. Cowpland
Ottawa, Ontario, Canada

[21] Appl. No. 881,189
[22] Filed Dec. 1, 1969
[45] Patented July 13, 1971
[73] Assignee Northern Electric Company Limited
Montreal, Quebec, Canada

[54] EQUALIZING AND ANTISIDETONE TELEPHONE CIRCUIT
5 Claims, 2 Drawing Figs.

[52] U.S. Cl. .......... 179/81 A
[51] Int. Cl. .......... H04m 1/58
[50] Field of Search .......... 179/81 A, 81 B, 170 NC

[56] References Cited
UNITED STATES PATENTS

| | | | |
|---|---|---|---|
| 3,330,912 | 7/1967 | Koseki | 179/81 B |
| 3,461,240 | 8/1969 | Lindgren | 179/81 B |

*Primary Examiner*—Kathleen H. Claffy
*Assistant Examiner*—William A. Helvestine
*Attorney*—Curphey and Erickson

ABSTRACT: A telephone circuit which equalizes transmit and receive signals to compensate for frequency dependent signal losses in a telephone line. Equalizing amplifiers are used which have a sloped frequency response and a variable gain characteristic that is responsive to the telephone line operating voltage which is itself responsive to the length of the telephone line. A balanced amplifier is also used to drive a telephone receiver with a balanced transmit signal and an unbalanced receive signal, the balanced transmit signal effectively cancelling out across the telephone receiver to provide antisidetone.

INVENTOR
MICHAEL C. J. COWPLAND
BY Curphey + Erickson
PATENT AGENTS

INVENTOR
MICHAEL C. J. COWPLAND
BY Curphey + Erickson
PATENT AGENTS

EQUALIZING AND ANTISIDETONE TELEPHONE CIRCUIT

This invention relates to a subscriber telephone set circuit of an antisidetone type and more particularly to such circuits which produce equalized transmit and receive signals.

The subscriber telephone set circuit is a hybrid device for two-wire to four-wire coupling. In the conventional circuit configuration, the transmitter and receiver are connected to a telephone central office through a single pair of wires. This means that transmitted and received signals are not separated and that the receiver tends to respond to the transmit signals as readily as to incoming receiver signals arriving from the telephone central office. The transmit signal which energizes the receiver is referred to as a sidetone signal or simply as sidetone. Noise picked up and amplifier by the telephone transmitter circuits, and heard as sidetone, tends to obscure incoming speech, thereby impairing reception. In a similar manner, the sound of a subscriber's own voice is heard more loudly than incoming speech, as a result of losses in the telephone line, and impels the talker involuntarily to lower his voice, which of course impairs the reception of his speech at the far end of the connection. The desirability, and in fact the need, of reducing sidetone has long been recognized, and operator and subscriber telephone circuits have been developed with this end in view.

Over the years, conventional antisidetone circuits in the form of hybrid circuit arrangements have seen wide and continuous use in order to overcome this problem. However, it has been found that in telephone sets where consideration of size and weight are material, as for example in dial-in-hand-type sets, the physical characteristics of a multiwinding hybrid coil and its associated cores present severe obstacles. This problem has been recognized in the prior art, and transistorized devices such as those disclosed in U.S. Pat. No. 2,762,867 granted to L. A. Meacham on Sept. 11, 1956, have been proposed as solutions. A more current solution to this problem is presented in an article entitled "AN ANTISIDETONE CIRCUIT FOR TELEPHONE SETS USING THE CIRCULATOR" by Matsuda and Terai, in the *Review of the Electrical Communication Laboratory*, Volume 16, Nos. 7—8, Jul.-Aug. 1968. The paper presents a new method to realize antisidetone circuits without hybrid transformers. However, it is expected that the circuit suffers from the usual circulator problems of instability arising from component drift and temperature variations.

The circuit disclosed by Meacham reduces the size and weight of telephone hybrid circuits considerably, but is lacking in that the antisidetone efficiency is reduced as line matching tends away from an optimum value. And, since the telephone line impedance varies with the line length, the Meacham circuit is flawed by the fact that minimum sidetone reception occurs only for a given telephone line length. Of course, a telephone line of any length may be balanced by changing the value of the balancing resistor in the Meacham circuit, however, at best this would be considered an inconvenience.

A further problem that occurs is that of equalizing the telephone line signal so as to compensate for telephone line variations which affect both transmitted signals and received signals. Ideally, this would be done in a manner that such telephone line variations, which also vary with the length of the telephone line, are compensated for automatically. It is well known in the telephone art that a current-sensitive, variable impedance element in a telephone line terminating network may be used to equalize the strength of transmission over the line regardless of the loop length. However, the inadequacy of this method resides in the fact that such compensation is optimum for only a single frequency and does not provide an optimum performance over the entire audiofrequency spectrum.

By means of the invention disclosed herein, the above described disadvantages are overcome. Since there are no inductors or transformers used in the circuit, the overall size of the circuit is kept small. As earlier mentioned, this is a desirable attribute for the dial-in-hand type of telephone set. And, since the circuit configuration, due to the invention, is insensitive, relatively speaking, to variations in the telephone line impedance, a minimum sidetone signal is readily obtained and maintained irrespective to the telephone line length. Finally, both outgoing transmit signals and incoming receiver signals are equalized to compensate for the telephone line loading effects which vary with the length of the telephone line.

The invention herein disclosed is a telephone circuit which comprises, in part, transmitter terminals for connection to a source of transmit signals, and line terminals for connection to a telephone line which is connected to sources of operating voltage and receive signals. The circuit also comprises a first amplifier means having an input connected to the transmitter terminals, a final output connected to the line terminals, and an intermediate output. There is also a balanced amplifier means having first and second inputs connected in parallel across the intermediate output, first and second outputs connected in parallel, a receiver output having connections for connection to a telephone receiver, and first and second push-pull input. Additionally, there is a second amplifier means having an input connected to the parallel connected first and second outputs, and an output connected to the first push-pull input. And finally, there is a third amplifier means having an input connected to the line terminals, and an output connected to the said second push-pull input. Accordingly, a transmit signal at the transmitter terminals will be connected to the line terminals, the receiver output having a balanced transmit signal thereacross, and a receive signal at the line terminals will be connected to the receiver output, appearing thereacross as an unbalanced receive signal.

One circuit embodiment of the invention herein disclosed will be fully understood from the following detailed description taken in connection with the appended drawings in which.

Figure 1:
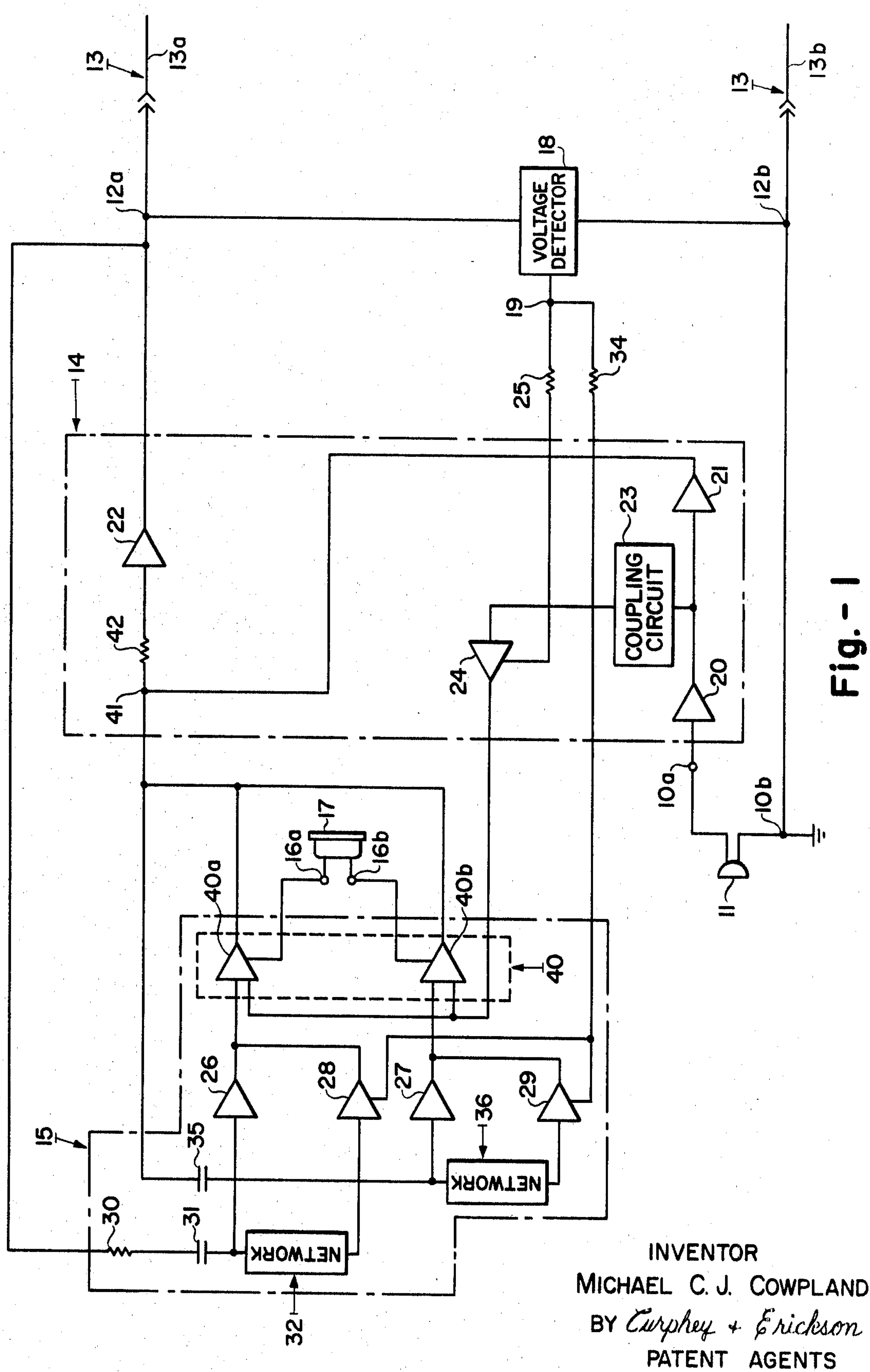
FIG. 1 is a block diagram of a subscriber telephone circuit.

Reference to FIG. 1 will show a block diagram of a transmit and receive, line-equalizing, antisidetone, subscriber telephone circuit. It will be seen that FIG. 1 includes a pair of transmitter terminals 10*a* and 10*b* for connecting the telephone circuit to a source of transmit signal voltage shown as an electret microphone transducer 11. A pair of line terminals 12*a* and 12*b* are for connecting the telephone circuit across a telephone line 13*a* and 13*b*. As shown in FIG. 1, the terminals 10*b* and 12*b* are connected together to form a common or ground connection for the subscriber telephone circuit. Between the pair of transmitter terminals 10*a* and 10*b* and the pair of line terminals 12*a* and 12*b* is connected a first amplifier means 14 which is responsive to transmit signals generated by the electret microphone transducer 11.

A second amplifier means 15 is shown, which amplifier means is responsive to both the transmit signals obtained from the electret microphone transducer 11 and also from receiver signals coming in on the telephone line 13, comprising single conductors 13*a* and 13*b*.

A pair of receiver terminals 16*a* and 16*b*, are for connecting a telephone receiver 17 to the second amplifier means 15.

FIG. 1 also shows an operating-voltage detector means 18 which is shown connected across the pair of terminals 12*a* and 12*b*. An output terminal 19, connected to the operating-voltage detector means 18, provides a direct current control voltage that is proportional to the operating voltage. It should be noted that the operating voltage is sent out on the telephone line from the telephone central office, consequently, the operating voltage at the terminals 12*a* and 12*b* is inversely proportional to the length of the telephone line due to voltage losses in the line.

In order to acquaint the reader with the operation of the specific embodiment of the invention herein disclosed, and to permit an easy understanding of the interrelationships of the various subcircuits in the telephone circuit of FIG. 1, the following description is given. In this regard, the description is presented in two parts, the first part dealing with the transmit mode of the telephone circuit, and the second part dealing with the receive mode of the telephone circuit.

In the transmit mode of operation, a transmit signal generated by the electret microphone transducer 11 is applied through the terminals 10*a* and 10*b* to the input of the first amplifier means 14. The transmit signal is linearly amplifier therein by a first channel of the first amplifier means 14, the first channel comprising a plurality of fixed gain and uniform frequency response amplifiers 20, 21, and 22. An output signal is taken from the amplifier 22, which is a telephone line driving amplifier having unity gain and no signal inversion property, and is applied across the terminals 12*a* and 12*b*.

Interposed between the amplifiers 20 and 21 is a signal coupling means 23 which is used to couple the transmit signal to the input of an amplifier 24 having a variable gain and a predetermined frequency response. The amplifier 24 comprises the second channel of the first amplifier means 14. An output signal from the amplifier 24 is applied to a signal input of the second amplifier means 15. It will be noted that the output terminal 19 is connected to a control input of the amplifier 24 by a resistor 25. In this way a direct current control voltage is applied to the amplifier 24 so as to control the variable gain thereof in a predetermined manner.

The second amplifier means 15 comprises third, fourth, and fifth channels with the fifth channel being common to both the third and fourth channels. In other words, the fifth channel receives input signals from both the third and fourth channels. The third channel comprises two receiver amplifiers 26 and 27, each of which have a fixed gain and a uniform frequency response. The fourth channel comprises two receiver amplifiers 28 and 29, each of which have a variable gain and a predetermined frequency response.

An input signal for the receiver amplifier 26 is obtained from the terminal 12*a* and is applied to the amplifier 26 through an R-C network consisting of a resistor 30 and a coupling capacitor 31. Furthermore, this signal is applied to the signal input of the receiver amplifier 28. But it is coupled thereto through a network 32 which has a predetermined frequency response, and therefore appears in the output of the amplifier 28 as an output signal having a predetermined frequency characteristic. It will be noted that a control input of the amplifier 28 is also connected to the output terminal 19 through an isolating resistor 34. The direct current control voltage available at the output terminal 19 is used to vary the gain of the amplifier 28 in a predetermined manner.

A separate input signal is applied to the second amplifier means 15 from the input of the transmit amplifier 22. This signal is coupled through a coupling capacitor 35 to the input of the receiver amplifier 27 from which it is also coupled through a second network 36 (the same as the network 32) to the input of the receiver amplifier 29. The direct current control voltage from the output terminal 19 is also applied to a control input of the amplifier 29 through the isolating resistor 34. As in the case of the receiver amplifier 28, this direct current control voltage is used to control the gain of the receiver amplifier 29 in a predetermined manner.

From FIG. 1 it will be seen that the amplifier 26 and 28 are effectively connected in parallel, as are the amplifiers 27 and 29. Furthermore, it is apparent that the operation of these two pairs of amplifiers will produce two composite output signals each having characteristics induced by both amplifiers in the pair. In this instance, the two composite output signals from the paired amplifiers 26, 28 and 27, 29 will show characteristics of both a uniform frequency response and that of a predetermined frequency response which in this case will be sloped in accordance with their predetermined frequency characteristic of the networks 32 and 36. i.e., a rising slope which increases as the frequency increases to provide a greater signal amplitude for higher frequencies than for lower frequencies.

Although the predetermined frequency characteristic of the composite output signals from the amplifier pairs is obtained as a result of the networks 32 and 36, it is within the capability of current amplifier design art to build in any desired frequency characteristic into the amplifiers 28 and 29, thus eliminating the separate networks 32 and 36.

The composite output signals from the amplifier pairs 26, 28 and 27, 29 are each applied to corresponding push-pull inputs of the fifth channel, a balanced amplifier 40 which comprises amplifiers 40*a* and 40*b*, each of which have a fixed gain and a uniform frequency response. The amplifiers 40*a* and 40*b* also have two parallel inputs which receive a signal from the transmit amplifier 24. Whenever the same input signal is applied to the push-pull inputs, the amplified signal developed in the output of each amplifier 40*a* and 40 *b* is in the same phase and is of the same amplitude. Consequently, there is no potential difference or signal unbalance between corresponding circuit points in the amplifiers 40*a* and 40*b*. Also, when a transmit signal is applied from the amplifier 24 to the parallel pair of inputs in the balanced amplifier 40, the telephone receiver 17 remains inoperative.

In the circuit embodiment of FIG. 1, the combined output currents from the amplifiers 40*a*, 40*b* and 21 are used to drive the input of the transmit amplifier 22. The transmit signals applied to the pair of line terminals 12*a* and 12*b* from the transmit amplifier 22 are also applied to the input of the receiver amplifiers 26 and 28. And, the composite output signal from this amplifier pair drives the push-pull input of the amplifier 40*a*. Normally this signal would then appear across the receiver output which comprises a pair of receiver terminals 16*a* and 16*b*, and consequently across the telephone receiver 17, where it not for an input signal which is applied to the input of the receiver amplifier pair 27, 29; the same signal applied to the input of the transmit amplifier 22. This signal is of the same phase and amplitude as the signal applied to the input of the receiver amplifier pair 26, 28. Consequently, the transmit signals applied to the push-pull inputs of the balanced amplifier 40 are of the same phase and amplitude, with the result that the telephone receiver 17 will remain inoperative as earlier described.

In the receive mode of operation, an incoming receive signal appearing at the terminal 12*a* is coupled through the resistor 30 and the coupling capacitor 31 to the input of the receiver amplifier 26, and through the network 32 to the input of the receiver amplifier 28. The composite output signal from this amplifier pair is applied to one input of the amplifier 40*a* wherein it is amplified and then applied to the input of the transmit amplifier 22. Concurrently, an input signal for the amplifier pair 27, 29, is obtained from the input of the transmit amplifier 22 through the coupling capacitor 35. But, even though this signal has the same phase relationship as the signal applied to the input of the amplifier pair 26, 28 the amplitudes of the two signals are sufficiently different so that an unbalanced signal will appear in the balanced amplifier 40 to cause the telephone receiver 17 to function. A potential difference is generated across the terminals 16*a* and 16*b*, which potential difference causes the receiver 17 to operate.

It will be recalled that in the transmit mode, the combined output currents of the amplifiers 40*a* and 40*b*, and 21 are used to generate a signal for the input of the amplifier pair 27, 29. This signal is the same amplitude and polarity of the transmit signal in the output of the amplifier 22, i.e., found across the terminals 12*a*and 12*b* which signal is fed back to the amplifier pair 26, 28. Accordingly, since the amplifiers 40*a* and 40*b* are each driven by the same output signals from their corresponding driver amplifiers, amplifier pairs 26, 28 and 27, 29 respectively, no potential difference is generated across the terminals 16*a* and 16*b* with the result that the telephone receiver 17 is inoperative in the transmit mode.

In the case of the receive mode of operation, the receive signal across the terminals 12*a* and 12*b* is of greater magnitude than the signal at the input of the amplifier 22. The reason for this is that since the amplifier 21 is responsive only to transmit signals, it does not provide an output current in the receive mode to combine with the output currents from the amplifiers 40*a* and 40*b* to drive the transmit amplifier 22. As a result, the amplifier pairs 26, 28 and 27, 29 are fed by signals of the same phase but unequal amplitude. The respective output signals from these amplifier pairs therefore drive the amplifiers 40*a* and 40*b* in an unbalanced manner which causes a potential difference to be generated across the terminals 16*a* and 16*b* which in turn operates the telephone receiver 17.

The preceding description shows the manner in which a transmit output signal may be applied to the telephone line when the subscriber telephone circuit is in the transmit mode, and concurrently how a side-tone signal in the telephone receiver 17 is substantially eliminated. The operation of the subscriber telephone set is also described for the receive mode. What remains to be discussed is the manner in which transmit signals and receive signals are equalized to overcome losses in the telephone line between the subscriber telephone set and the telephone central office.

In the transmit mode it has been described how the amplifiers 20, 21 and 22 amplified the transmit signal from the electret microphone 11 and applied this amplified signal across the terminals 12*a* and 12*b*. However, the required equalization of the speech signal is done only by the amplifier 24. Since this amplifier has a variable gain and a predetermined frequency response, the required amplification of the speech signal comes under the control of the direct current control voltage available at the output terminal 19. It will be remembered that the amplitude of this control voltage is inversely proportional to the length of the telephone line. Furthermore, the variable gain of the amplifier 24 is inversely proportional to the amplitude of the direct current control voltage. Consequently, these two inverse relationships combine to form a direct relationship between the variable gain of the amplifier 24 and the length of the telephone line 13. Thus, as the telephone line 13 becomes longer, a larger compensating equalizing effect is introduced by the amplifier 24. Output signals from the transmit amplifier 24 are applied to parallel inputs in the balanced amplifier 40. As previously described, this results in a minimum sidetone signal, but the output signal currents from the amplifiers 40*a* and 40*b* are combined with the output signal current of the transmit amplifier 21 to drive the amplifier 22. Thus, the output of the amplifier 22 contains both the unequalized transmit signal and also the equalized transmit signal. These two signals form a composite transmit signal which appears as an equalized signal across the terminals 12*a* and 12*b* so as to overcome the frequency dependent loading effect of the telephone line 13.

It has been previously described how the receiver amplifiers function in the receive mode so as to operate the telephone receiver 17. It will be recalled that a receive input signal is applied to the signal inputs of the amplifiers 28 and 29, which amplifiers have a variable gain and a predetermined frequency response. As in the case of gain control in the transmit amplifier 24; the direct current control voltage obtained from the output terminal 19 is applied to both of the amplifiers 28 and 29. It will be remembered that the magnitude of the direct current control voltage obtained from the output terminal 19 bears an inverse relationship to the length of the telephone line 13. And, as in the case of the transmit amplifier 24, the receiver amplifiers 28 and 29 each have a variable gain which has an inverse relationship to the magnitude of the applied direct current control voltage. Thus, these two inverse relationships combine to form a direct relationship so that as the length of the telephone line increases, the gain of the amplifiers 28 and 29 likewise increases to provide an automatic equalization of the receive signal.

Figure 2:
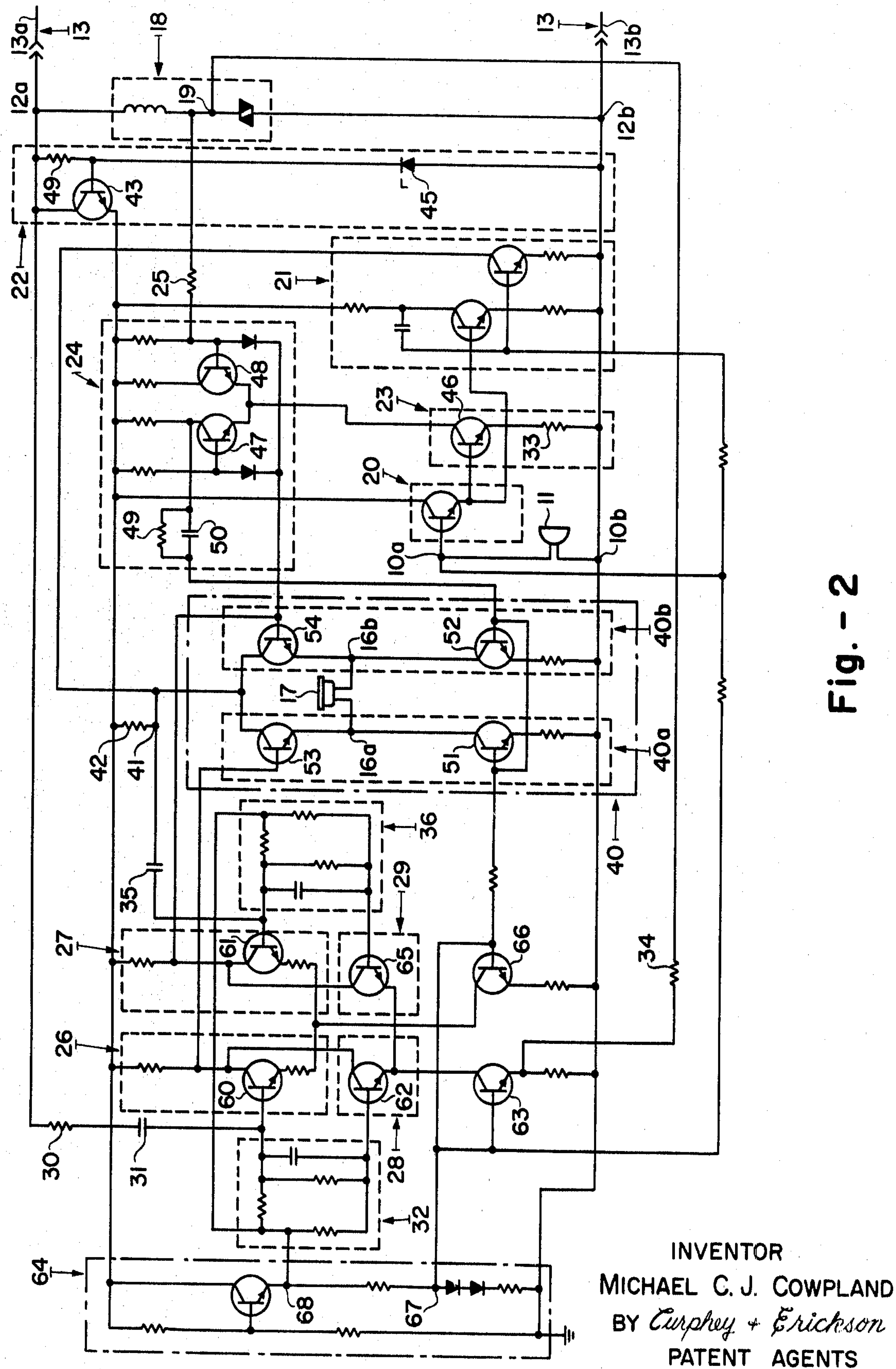
FIG. 2 is a schematic diagram of the blocked out circuit represented by FIG. 1.

The schematic diagram of FIG. 2 is a specific embodiment of the invention which is more generally depicted in the block diagram of FIG. 1. Therefore, whereas FIG. 1 may be generally interpreted in a number of specific circuits, the schematic diagram of FIG. 2 is but one such specific circuit embodiment.

The circuit blocks of FIG. 1 may be directly equated to specific circuit structure as shown in FIG. 2. Thus, in the transmit portion of the subscriber telephone circuit, FIG. 2 shows an electret microphone transducer 11 connected across the pair of transmitter terminals 10*a* and 10*b*. The terminal 10*a* is further connected to the input of an amplifier shown generally as an amplifier 20 comprising a single transistor. The output of the amplifier 20 is connected to the input of the amplifier 21 which includes two conventionally arranged grounded emitter transistor amplifiers. The signal output of the amplifier 21 is shown connected to a junction 41 from which it is connected through a load resistor 42 to the input of the amplifier 22. The amplifier 22 is shown generally as a telephone line driver amplifier and includes a grounded base transistor 43 having a base current limiting resistor 44 connected between the base and the terminal 12*a*, and a Zener diode 45 connected between the base and the terminal 12*b*, the diode function being to provide a substantially constant base bias voltage. The collector of the transistor 43 is shown connected to the terminal 12*a*. The preceding comprises the circuit structure for the fixed gain and the uniform frequency response amplifiers used in the transmit signal circuitry of the subscriber telephone circuit.

Referring now to the equalizing portion of the transmit circuitry, it may be seen in FIG. 2 that a transmit signal is picked off between the amplifiers 20 and 21 and is coupled to the amplifier 24. In FIG. 1 a coupling means 23 is shown as performing this function. In FIG. 2, the means 23 is shown as an amplifier circuit 23 which comprises a single transistor 46 having its emitter connected through an emitter resistor 33 to the ground connection. The collector of the transistor 46 is connected directly to the signal input of the amplifier 24.

The amplifier 24 comprises a pair of transistors 47 and 48, and their associated components, arranged in a symmetrical configuration. The emitters of these two transistors are connected together and to the collector of the transistor 46. It may be seen that the transistor 46 acts as a variable emitter resistor for the transistors 47 and 48. Therefore, by controlling the current through the transistor 46 the currents through the transistors 47 and 48 may likewise be controlled. It will be further noted that the base of the transistor 48 is connected through the isolating resistor 25 to the junction 19. As current through the transistor 48 is varied in accordance with the applied direct current control voltage to its base, current through the transistor 47 is likewise varied. Thusly, the transistor 48 acts to control the gain of the transistor 47, which performs as the amplifier stage. The output signal from the transistor 47 is coupled through a frequency sensitive circuit, comprising a resistor 49 and a capacitor 50 in parallel, to the balanced amplifier 40.

The balanced amplifier 40 comprises amplifiers 40*a* and 40*b* which include transistors 51, 52, 53, and 54. The transistors 51 and 42 are used to drive the emitters of the transistors 53 and 54 respectively. The output signal from the transistor 47, applied to the bases of the transistors 51 and 52, is amplified by the amplifiers 40*a* and 40*b*. This amplified signal appears across the terminals 16*a* and 16*b* which are connected between the collectors of the transistors 51 and 52 respectively. However, since the signal appearing at each of the terminals 16*a* and 16*b*is of the same phase and amplitude there is no potential difference between these two terminals with the result that no actuating current flows through the telephone receiver 17. Accordingly, in the transmit mode, the telephone receiver 17 does not function and antisidetone is realized.

In the particular embodiment of the invention shown in FIG. 2, the balanced amplifier 40 performs a multiplicity of functions. The first of these is that of a telephone receiver driver. The second function is to act as a low impedance driver amplifier, along with the amplifier 21, in order to adequately drive the amplifier 22 which is a telephone line driving amplifier. The transmit signal which is applied to the bases of the transistors 51 and 52 is amplified an appears in the collector circuits of the transistors 53 and 54. The collector currents from the transistors 53 and 54, which are of the same amplitude and phase, are conducted through the collector load resistor 42 to the emitter of the transistor 43. A low impedance driver is required because of the low impedance nature of the emitter of the transistor 43.

The combined collector currents from the transistors 53 and 54 (and the output signal current from the amplifier 21 when in the transmit mode) develop a signal voltage between the junction 41 and the ground connection. This is the third function of the balanced amplifier 40. This signal is coupled by means of the coupling capacitor 35 to the signal input of the receiver amplifier 27. It will be observed from FIG. 2 that there is a signal path from the terminal 12*a*, through the series combination of the resistor 30 and the coupling capacitor 31, to the signal input of the receiver amplifier 26. During the transmit mode of operation, the transmit signal across the terminals 12*a* and 12*b* is coupled back along this path to the receiver amplifier 26. In a similar manner, the transmit signal appearing at the junction 41 is coupled through the coupling capacitor 35 to the signal input of the receiver amplifier 27. The amplified signals from the receiver amplifiers 26 and 27 are fed back to the bases of the transistors 53 and 54 respectively. Since these amplified signals are of the same phase and amplitude, there is no potential difference developed across the terminals 16*a* and 16*b*. Consequently, the telephone receiver 17 remains inoperative and antisidetone is effected.

It was earlier mentioned that the parallel combination of the resistor 49 and the capacitor 50 comprises a frequency sensitive coupling network from the amplifier 24 to the balanced amplifier 40. It has also been earlier described that the signal outputs of the amplifiers 40*a* and 40*b* and that of the amplifier 21 are combined to drive the transistor 43. It is clear therefore that the amplifier 21 treats the transmit signal from the electret transducer 11 with a fixed gain and a flat frequency response, whereas the combination of the amplifier 24 followed by the balanced amplifier 40 amplifies a like transmit signal at a variable gain established by the direct current control voltage, and at a predetermined frequency response established by the frequency characteristic of the coupling network comprising the resistor 49 and the capacitor 50.

In the receive mode of operation of the circuit in FIG. 2, a receive signal, which travels down the telephone lines 13 from the telephone central office, terminates at the pair of line terminals 12*a* and 12*b*. From the terminal 12*a* the receive signal is connected through the resistor 30 and the coupling capacitor 31 to the signal input of the receiver amplifier 26. The receive signal is amplified and is connected from the collector of a transistor 60 therein to the base of the transistor 53 in the amplifier 40*a*. The receive signal is further amplified by the transistor 53 and appears at the junction 41 from which it is coupled through the coupling capacitor 35 to the signal input of the receiver amplifier 27. At this point the receive signal is the same phase as the corresponding signal at the input of the receiver amplifier 26 due to phase inversion in the transistors 60 and 53. However, these two receive signals differ in amplitude. This occurs because the transmit amplifier 21 is not responsive to receive signals with the result that there is no output signal current from this amplifier to add to that of the amplifiers 40*a* and 40*b*. Therefore, in the receive mode the signal voltage developed at the junction 41 and applied to the input of the receiver amplifier 27 is necessarily less than the receive signal appearing at the terminal 12*a*, which signal is coupled to the input of the receiver amplifier 26. Accordingly, the signal applied to the base of the transistor 61, which forms the signal input of the receiver amplifier 27, is amplified and is connected from the collector of that transistor to the base of the transistor 54 in the amplifier 40*b*. Thus is obtained a condition where, in the receive mode of operation the base of the transistor 53 is driven by a receive signal of one polarity, and the base of the transistor 54 is driven by a receive signal of the same polarity but of reduced amplitude. The situation is that current through one transistor increases or decreases a greater amount than the current through the other transistor, thereby causing a potential unbalance between the terminals 16*a* and 16*b* which is of a sufficient magnitude to adequately drive the telephone receiver 17.

The receiver amplifier 28 in FIG. 2 is shown as comprising a transistor 62, which is used to amplify the receive signal. A transistor 63 is connected to the emitter of the transistor 62 where it functions as a variable emitter impedance. The direct current control voltage available from the terminal 19 is applied through a series isolating resistor 34 to the emitter of the transistor 63. Since the base of the transistor 63 is held at a constant direct current voltage obtained from a bias supply 64 and the direct current control voltage is a variable quantity, the emitter to base voltage of the transistor 63 varies and controls the collector current in that transistor. Since the collector of the transistor 63 is connected to the emitter of the transistor 62, current variations in the transistor 63 are also felt in the transistor 62 resulting in an effective gain control of that stage.

The amplifier 29 comprises a transistor 65 having its collector connected to the collector of the transistor 61. As in the case of the transistor 62, the gain of the transistor 65 is likewise varied in step with current variations through the transistor 63 since the collector of the transistor 63 is also connected to the emitter of the transistor 65. The collector current from the transistor 63 is split between the two transistors 62 and 65.

A transistor 66 is shown connected between the ground connection and the two emitters of the transistors 60 and 61. A direct current bias potential taken from a junction 67 of the bias circuit 64 is applied to the base of the transistor 66 whereby current through that transistor is held substantially constant. A substantially constant current thus flows through the transistors 60 and 61 and results in a fixed gain in these two transistors.

The networks 32 and 36 each comprise several components, three resistors and a capacitor. Both of these networks are structurally identical and as a result have the same frequency characteristic. Thus, in the case of the transistor 60, an incoming signal coupled through the capacitor 31 to the base of the transistor 60 will be amplified by that transistor at a fixed gain and with a uniform frequency response. The same signal coupled through the network 32 to the base of the transistor 62 will be amplified with a variable gain, depending upon the value of the direct current control voltage obtained from the operating-voltage detector means 18, and with a rising frequency response set by the frequency band-pass characteristic of the network 32. A similar mode of operation applies to the transistor 61, the network 36, and the transistor 65. The fact that the collectors of the transistors 60, 62 and the collectors of the transistors 61, 65 are connected together and to corresponding bases of the transistors 53 and 54 means that each of these signal inputs of the balanced amplifier 40 will receive a composite receive signal containing a fixed gain, flat frequency response portion and a portion having a variable gain and a sloped frequency response that rises as the frequency increases. Telephone line losses suffered by the receive signal are therefore compensated through signal equalization introduced by the cooperative combination of the receiver amplifiers 26, 27, 28 and 29.

It will be observed from FIG. 2 that corresponding similar points in the networks 32 and 36 are connected to a junction 68 in the bias circuit 64. Therefore, the direct current, substantially constant, bias voltage that is applied to the bases of the transistors 60 and 61 in combination with the bias voltage applied to the emitters of these transistors through the transistor 66 establishes a fixed gain characteristic in the amplifiers 26 and 27.

What I claim is:

1. A telephone circuit comprising:

transmitter terminals for connection to a source of transmit signals;

line terminals for connection to a telephone line which is connected to sources of operating voltage and receive signals;

a first amplifier means having an input connected to the transmitter terminals, a final output connected to the line terminals, and an intermediate output;

a balanced amplifier means having first and second inputs connected in parallel across the intermediate output, first and second outputs connected in parallel, a receiver output having connections for connection to a telephone receiver, and first and second push-pull inputs;

a second amplifier means having an input connected to the parallel connected first and second outputs, and an output connected to the said first push-pull input;

and, a third amplifier means having an input connected to the line terminals, and an output connected to said second push-pull input, whereby a transmit signal at the transmitter terminals will be connected to the line terminals, the receiver output having a balanced transmit signal thereacross, and whereby a receive signal at the line terminals will be connected to the receiver output, appearing thereacross as an unbalanced receive signal.

2. A telephone circuit as defined in claim 1 further comprising;

a voltage detector means connected across the line terminals for detecting the operating voltage, and obtaining therefrom a direct-current control voltage output;

and wherein the first, second and third amplifier means each have a control input connected to the voltage detector means output;

and wherein the first, second and third amplifier means have a variable gain and a predetermined frequency response, which variable gain is responsive to the magnitude of the said control voltage, whereby the transmit signal connected to the line terminals will be equalized, and the unbalanced receive signal across the receiver output will be equalized.

3. A telephone circuit as defined in claim 2 wherein:

the balanced amplifier means consists of a pair of amplifiers with each amplifier comprising a first and a second transistor each having an emitter, a base and a collector, where, in the first transistors the emitters are connected to a ground connection, the bases from the first and second parallel inputs, and the collectors form the receiver output, and where, in the second transistors the emitters are connected to corresponding collectors of the first transistors, the bases form the first and second push-pull inputs and the collectors form the first and second outputs.

4. A telephone circuit as defined in claim 3 wherein:

the second and third amplifier means each comprise a pair of amplifiers, the one having a substantially fixed gain and a uniform frequency response, and the other including the control input and having a variable gain responsive to the said control voltage and also having a sloped frequency response which rises with frequency, the inputs of each said pair of amplifiers being connected in parallel to form the said input thereof, and the outputs of each said pair of amplifiers being connected in parallel to form the said output thereof.

5. A telephone circuit as defined in claim 3 wherein:

the second and third amplifier means each comprise a pair of amplifiers having a uniform frequency response, the one having a substantially fixed gain, and the other including the control input and having a variable gain responsive to the said control voltage;

and the said circuit further comprising a pair of signal coupling networks each having a sloped frequency response which rises with frequency, each one of the said pair of networks being connected between the inputs of a respective pair of amplifiers, the input of the amplifier having a substantially fixed gain comprising the respective input of the second and third amplifier means, and the outputs of each said pair of amplifiers being connected in parallel and comprising the respective output of the second and third amplifier means.